US010265921B2

(12) United States Patent
Gritti

(10) Patent No.: US 10,265,921 B2
(45) Date of Patent: Apr. 23, 2019

(54) AUTOMATIC MACHINE FOR PROVIDING CORRUGATED SHEET-LIKE ELEMENTS

(71) Applicant: INTERWAVE S.R.L., Bergamo (IT)

(72) Inventor: Fabio Angelo Gritti, Cologno al Serio (IT)

(73) Assignee: GRIFAL S.P.A., Cologno Al Serio (Bergamo) (IT)

( * ) Notice: Subject to any disclaimer, the term of this patent is extended or adjusted under 35 U.S.C. 154(b) by 0 days.

(21) Appl. No.: 15/303,227

(22) PCT Filed: Mar. 30, 2015

(86) PCT No.: PCT/EP2015/056915
§ 371 (c)(1),
(2) Date: Oct. 11, 2016

(87) PCT Pub. No.: WO2015/155051
PCT Pub. Date: Oct. 15, 2015

(65) Prior Publication Data
US 2017/0036411 A1   Feb. 9, 2017

(30) Foreign Application Priority Data
Apr. 8, 2014  (IT) .............................. MI2014A0650

(51) Int. Cl.
*B31F 1/30*   (2006.01)
*B31F 1/29*   (2006.01)
(Continued)

(52) U.S. Cl.
CPC ............ *B31F 1/305* (2013.01); *B29C 53/005* (2013.01); *B29C 53/24* (2013.01); *B29C 65/10* (2013.01);
(Continued)

(58) Field of Classification Search
None
See application file for complete search history.

(56) References Cited

U.S. PATENT DOCUMENTS 1,698,925 A    1/1929  Stickney
2,556,011 A *  6/1951  Swayze .................. B28B 1/528
                                              264/286
(Continued)

FOREIGN PATENT DOCUMENTS

EP    1620253 B1     5/2008
WO    2004098867 A1  11/2004

OTHER PUBLICATIONS

International Search report dated Jun. 5, 2015 re: Application No. PCT/EP2015/056915; pp. 1-3; citing: U.S. Pat. No. 1,698,925 A, U.S. Pat. No. 3,157,551 A and WO 2004/098867 A1.
(Continued)

*Primary Examiner* — Barbara J Musser
(74) *Attorney, Agent, or Firm* — Cantor Colburn LLP

(57) ABSTRACT

An automatic machine for providing corrugated sheet-like elements having a component for the continuous corrugation of a ribbon in motion in a longitudinal direction. The corrugation component includes an upper conveyor and a lower conveyor. The upper conveyor includes a plurality of upper abutment elements that are extended substantially transversely to the longitudinal direction of motion of the ribbon. The lower conveyor includes a plurality of lower abutment elements that are extended substantially transversely to the longitudinal direction of motion of the ribbon. The upper abutment elements are intercalated between the lower abutment elements in a work area. The upper abutment elements each comprise include a flap, which has, in the end adapted to make contact with the ribbon, at least one portion that has a grip component.

4 Claims, 6 Drawing Sheets

(51) Int. Cl.
  *B29C 53/00* (2006.01)
  *B29C 53/24* (2006.01)
  *B29C 65/10* (2006.01)
  *B29C 65/48* (2006.01)
  *B32B 3/28* (2006.01)
  *B32B 27/32* (2006.01)
  *B32B 37/06* (2006.01)
  *B32B 37/12* (2006.01)
  *B29K 105/04* (2006.01)

(52) U.S. Cl.
  CPC ............... *B29C 65/48* (2013.01); *B31F 1/29* (2013.01); *B32B 3/28* (2013.01); *B32B 27/32* (2013.01); *B32B 37/06* (2013.01); *B32B 37/12* (2013.01); *B29K 2023/06* (2013.01); *B29K 2105/04* (2013.01); *B32B 2305/02* (2013.01); *B32B 2323/04* (2013.01)

(56) References Cited

U.S. PATENT DOCUMENTS

| | | | | |
|---|---|---|---|---|
| 3,157,551 A | * | 11/1964 | Granozio | B31F 1/305 156/471 |
| 3,745,056 A | * | 7/1973 | Jackson | B60R 13/04 428/157 |
| 5,296,280 A | * | 3/1994 | Lin | B31D 3/0223 156/197 |

OTHER PUBLICATIONS

Written Opinion dated Jun. 5, 2015 re: Application No. PCT/EP2015/056915; pp. 1-5; citing: U.S. Pat. No. 1,698,925 A, U.S. Pat. No. 3,157,551 A and WO 2004/098867 A1.

* cited by examiner

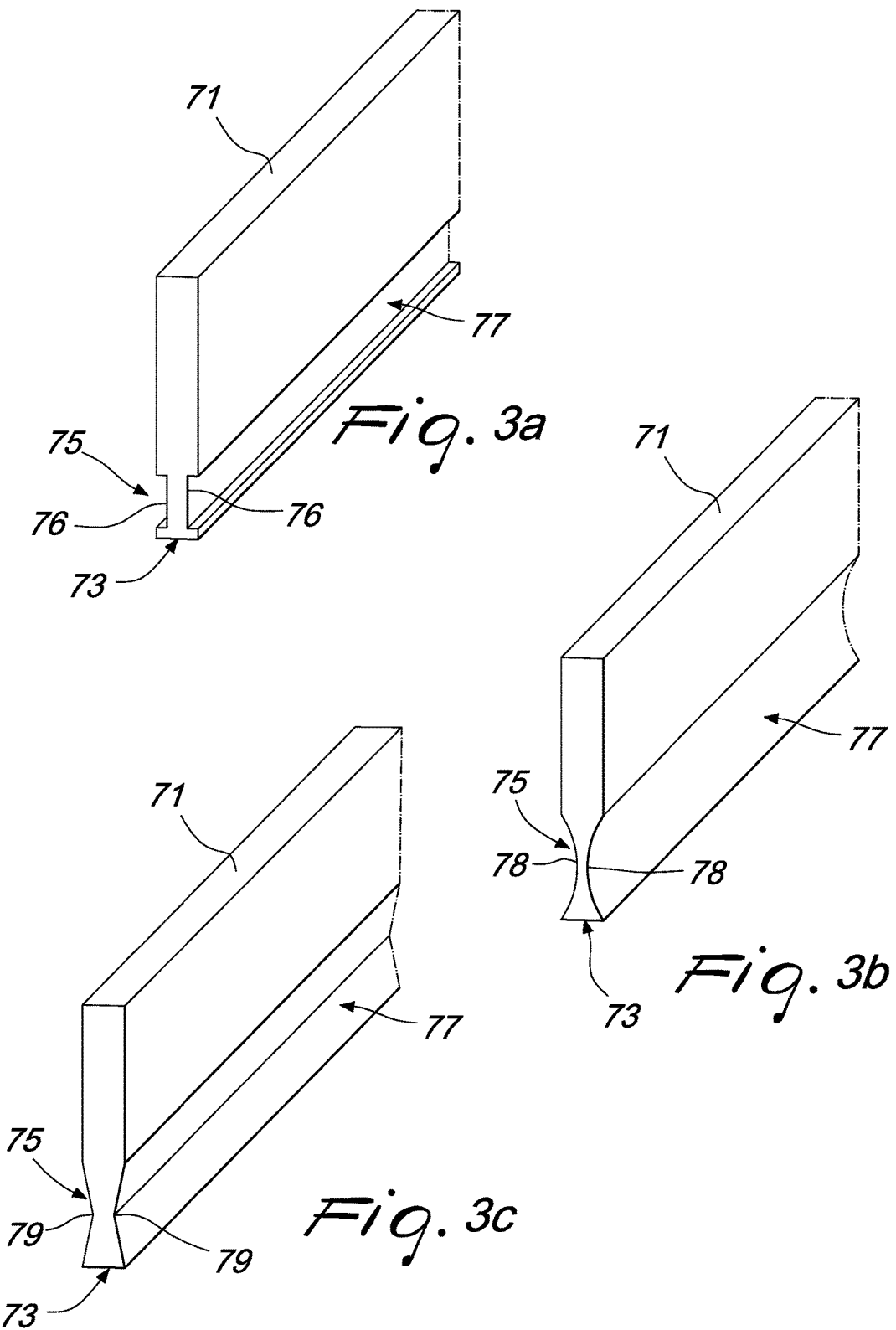

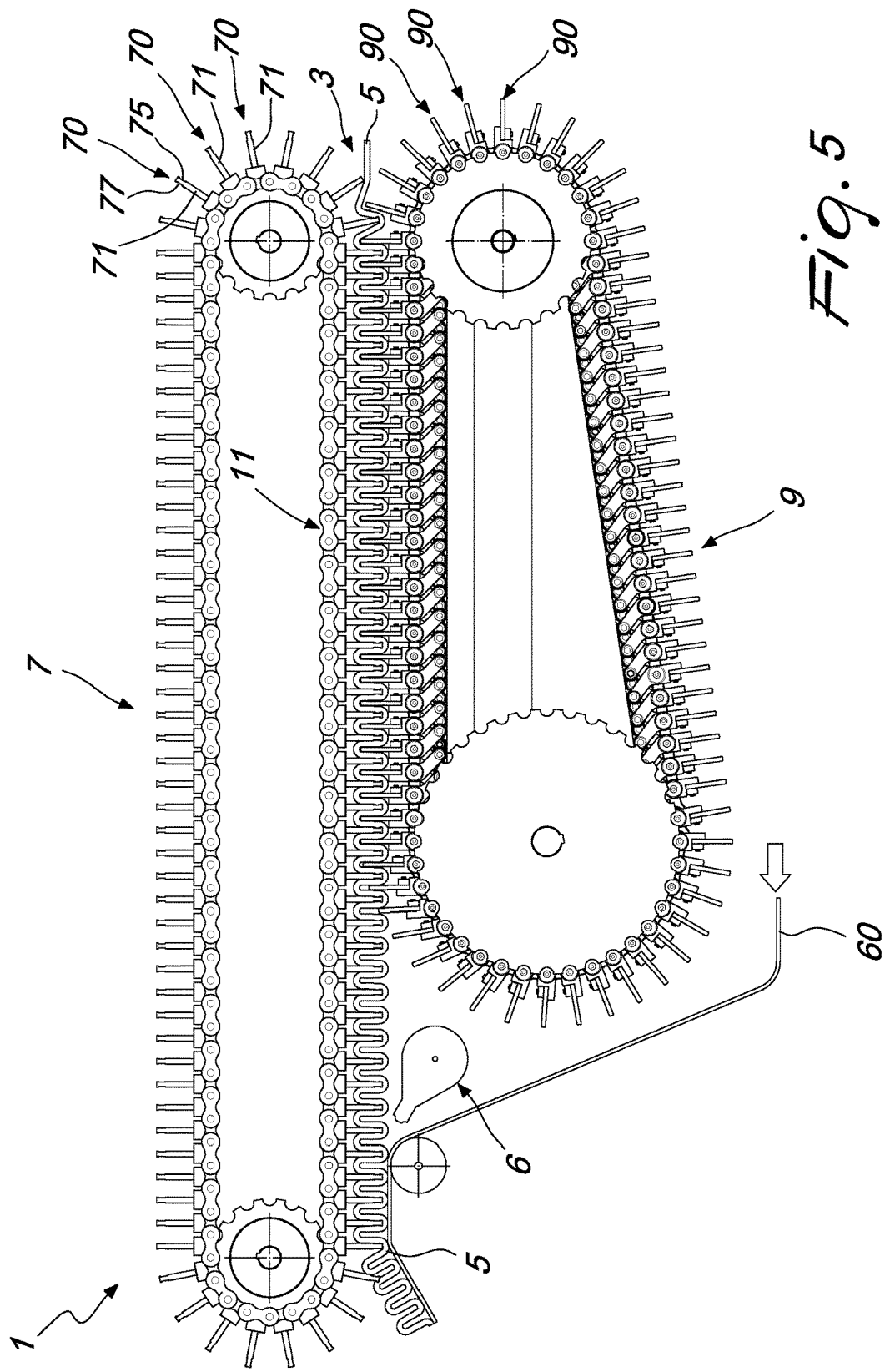

AUTOMATIC MACHINE FOR PROVIDING CORRUGATED SHEET-LIKE ELEMENTS

TECHNICAL FIELD

The present disclosure relates to a machine for providing corrugated sheet-like elements.

BACKGROUND

Machines for the provision of corrugated sheet-like elements made of various materials, to be used for example for packaging or for thermal insulation or soundproofing, are currently known.

Conventional machines usually comprise two chain conveyors, or shaping elements, which move along a closed path a plurality of transverse flaps or bars also known as rods.

In the background art, as disclosed in EP1620253B1 by the same Applicant, these rods are moved into the working position by a dedicated mechanism.

Specifically, the transverse flaps of each conveyor provide a sort of comb. The flaps of one conveyor face, in the working or the formation area of the corrugated sheet-like element, the rods of the other conveyor, being intercalated between them. The sheet-like element is therefore pushed by the flaps of the two conveyors, which, being mutually intercalated, press the sheet-like element, providing the typical "wavelike" deformation of said element.

Conventional machines further comprise means for joining the corrugated sheet-like element thus obtained to one or more other flat sheet-like elements, at the peaks of the provided corrugations, in order to provide a composite structure.

The machines of the known type are not devoid from drawbacks. In particular, at the end of the joining process, the rods are still inside the corrugation and must be extracted from said corrugations by means of a complex mechanism that allows their outward movement, parallel to the corrugation. An additional mechanism must then return the rods to the working position, so that they can be used again to provide the sheet-like corrugated element. The movement of such rods, therefore, occurs in a direction that is substantially transverse to the direction of motion of the corrugated material and therefore entails a considerable reduction of the production rates as well as a considerable and expensive mechanical complication.

Moreover, said rods are a severe limitation to the size of the corrugations of the sheet-like element, since their thickness cannot be reduced below a correct size.

SUMMARY

The aim of the present disclosure is to provide a machine for providing corrugated sheet-like elements that solves the drawbacks described above and overcomes the limitations of the background art.

Within this aim, the present disclosure provides a machine for providing corrugated sheet-like elements that can be used to process the most disparate types of material, including also elastic materials.

The disclosure also provides a machine for providing corrugated sheet-like elements that have smaller pitches and heights than allowed by the mechanical bulks inherent in machines of the known type, due to the use of the above cited rods.

The disclosure further provides a machine that has a high production rate, higher than currently available in machines of the known type.

The disclosure also provide a machine for providing corrugated sheet-like elements that is very simple to set up.

The disclosure further provides a machine for providing corrugated sheet-like elements that can give the greatest assurances of reliability and safety in use.

The disclosure provides a machine for providing corrugated sheet-like elements that is easy to provide and economically competitive if compared with the background art.

These advantages are achieved by providing an automatic machine for providing corrugated sheet-like elements, comprising means for the continuous corrugation of a ribbon in motion in a longitudinal direction, said corrugation means comprising an upper conveyor and a lower conveyor, said upper conveyor comprising a plurality of upper abutment elements that are extended substantially transversely to said longitudinal direction of motion of said ribbon, said lower conveyor comprising a plurality of lower abutment elements that are extended substantially transversely to said longitudinal direction of motion of said ribbon, said upper abutment elements being intercalated between said lower abutment elements in a work area, characterized in that said upper abutment elements each comprise a flap, which has, in the end adapted to make contact with said ribbon, at least one portion comprising grip means.

BRIEF DESCRIPTION OF THE DRAWINGS

Further characteristics and advantages will become better apparent from the description of a preferred but not exclusive embodiment of a machine for providing corrugated sheet-like elements, illustrated by way of nonlimiting example in the accompanying drawings, wherein:

FIGS. 3a to 3e are views of five different types of flaps of the machine of FIG. 1 according to the disclosure;

FIG. 5 is a view of a second variation of the machine for providing corrugated sheet-like elements according to the disclosure.

DETAILED DESCRIPTION OF THE DRAWINGS

Figure 1:
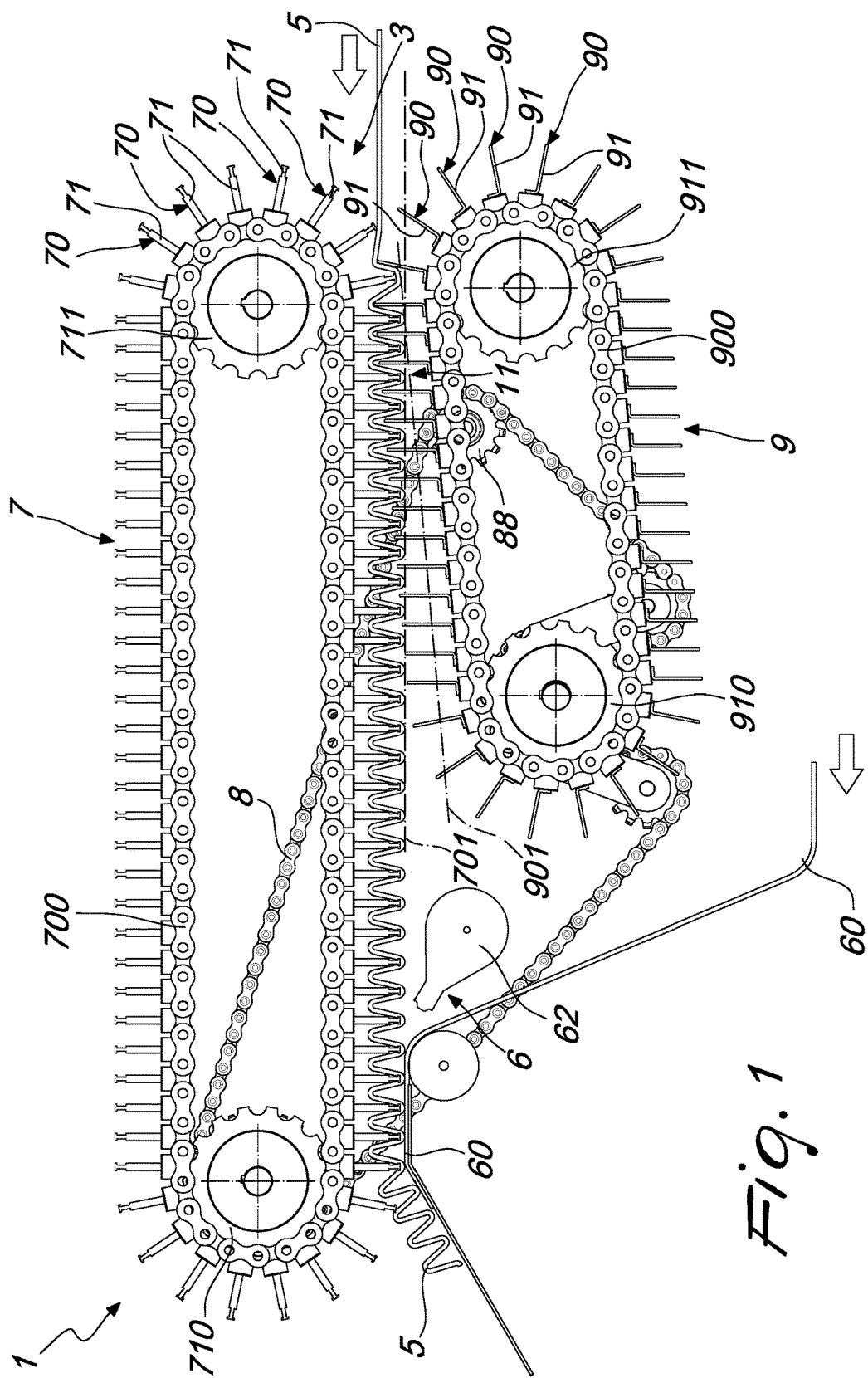
FIG. 1 is a schematic side view of an embodiment of a machine for providing corrugated sheet-like elements, according to the disclosure.

With reference to the figures, the machine for providing corrugated sheet-like elements, generally designated by the reference numeral 1, comprises means 3 for the continuous corrugations of a ribbon 5 that moves in a longitudinal direction.

The corrugation means 3 comprise an upper conveyor 7 and a lower conveyor 9.

The upper conveyor 7 comprises a plurality of upper abutment elements 70, which are extended substantially transversely to the longitudinal direction of motion of the ribbon 5.

The lower conveyor 9 comprises a plurality of lower abutment elements 90, which are extended substantially transversely to the longitudinal direction of motion of the ribbon 5.

The upper abutment elements 70 are intercalated between the lower abutment elements 90 in a work area 11, where the corrugations of the ribbon 5 are formed.

According to the disclosure, the upper abutment elements 70 each comprise a flap 71, 91, which has, in the end 73 adapted to make contact with the ribbon 5, at least one portion that comprises grip means 75, 77, 770 as shown in FIGS. 3a, 3b, 3c, 3d and 3e.

Advantageously, the machine 1 is configured to work on a ribbon 5 made of an elastic material, such as for example expanded polyethylene.

Advantageously, the grip means 75, 77 of each flap 71 are defined by one or two mutually opposite undercut portions 75 and 77.

The undercut portions 75 and 77 can each be defined by a rectangular recess 76, as shown in FIG. 3a, or by a curvilinear recess 78, as shown in FIG. 3b, or also by a triangular recess 79, as shown in FIG. 3.

The undercut portions 75 and 77 can also be defined by a combination of the above cited rectangular, curvilinear or triangular shapes. The geometric shapes of the flaps 71, shown in FIGS. 3a, 3b and 3c, are in fact examples and represent only some preferential shapes. The particular characteristic of the flaps 71 in fact resides in that they have an undercut portion of any shape, so long as it is configured to retain the deformed elastic material of which the ribbon 5 is advantageously made.

Figure 3D:
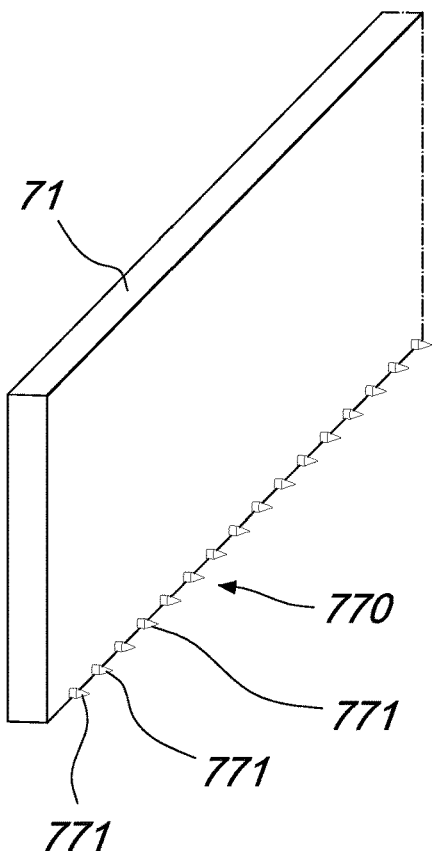

As an alternative, as shown in FIG. 3d, the grip means 770 of each flap 71 can comprise a series of grip spikes 771, which advantageously have a conical needle-like shape and are arranged longitudinally along the side of the flap 71. The spikes 771 can be arranged on a single side or on both sides of the flap 71.

Figure 3E:
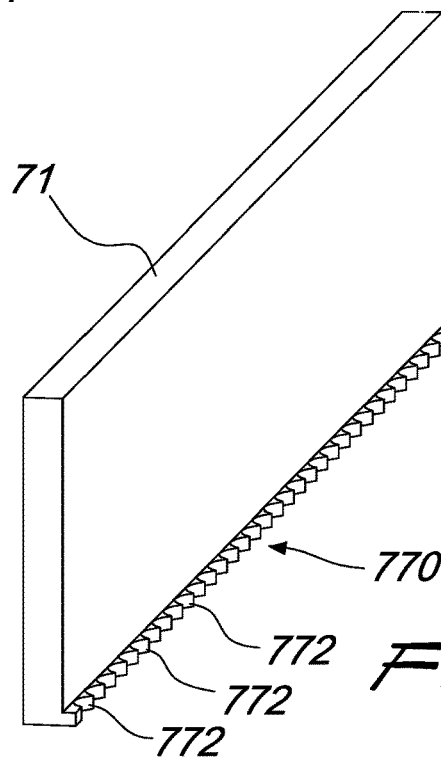

As an alternative, as shown in FIG. 3e, the grip means 770 of each flap 71 can comprise a series of pointed grip protrusions 772, which are arranged longitudinally along the side of the flap 71. The pointed protrusions 772 can be arranged on a single side or on both sides of the flap 71.

As already mentioned, the ribbon 5 can be made of an elastic material, such as a material of the type of expanded polyethylene. The automatic machine 1, thanks to the fact that the flaps 71 comprise at least one portion with grip means 75, 77, 770, is particularly effective in the processing of ribbons 5 made of elastic material.

Each one of the corrugations progressively provided on the ribbon 5 in the work area 11 is advantageously retained by the particular geometry of the flaps 71 and in particular by the presence of the portion with grip means 75, 77, 770. Moreover, the elasticity of the material of which the ribbon 5 is made and the consequent deformability thereof contribute to prevent the ribbon 5 being processed from escaping from the flaps 71.

Advantageously, the upper conveyor 70 and the lower conveyor 90 each comprise respectively an upper chain 700 and a lower chain 900, which unwind continuously, wherein the upper abutment elements 70 and the lower abutment elements 90 are associated respectively with the links of the upper chain 700 and of the lower chain 900. At least in the work area 11, the lower chain 900 defines a lower movement direction 901 of the lower abutment elements 90 that is inclined with respect to the upper movement direction 701 of the upper abutment elements 70 defined by the upper chain 700. In this manner, the lower abutment elements 90, in their motion along the lower movement direction 901, move away transversely from the upper abutment elements 70, releasing the corrugations of the ribbon 5 freshly formed in the work area 11.

Advantageously, the upper conveyor 7 comprises at least two upper sprockets 710 and 711, with which the upper chain 700 is associated. Likewise, the lower conveyor 9 also can comprise at least two lower sprockets 910 and 911, with which the lower chain 900 is associated. At least one upper sprocket 710 is connected kinematically to at least one lower sprocket 910, so that the rotation of the upper sprocket 710 produces the rotation of the lower sprocket 910 or vice versa.

Figure 2:
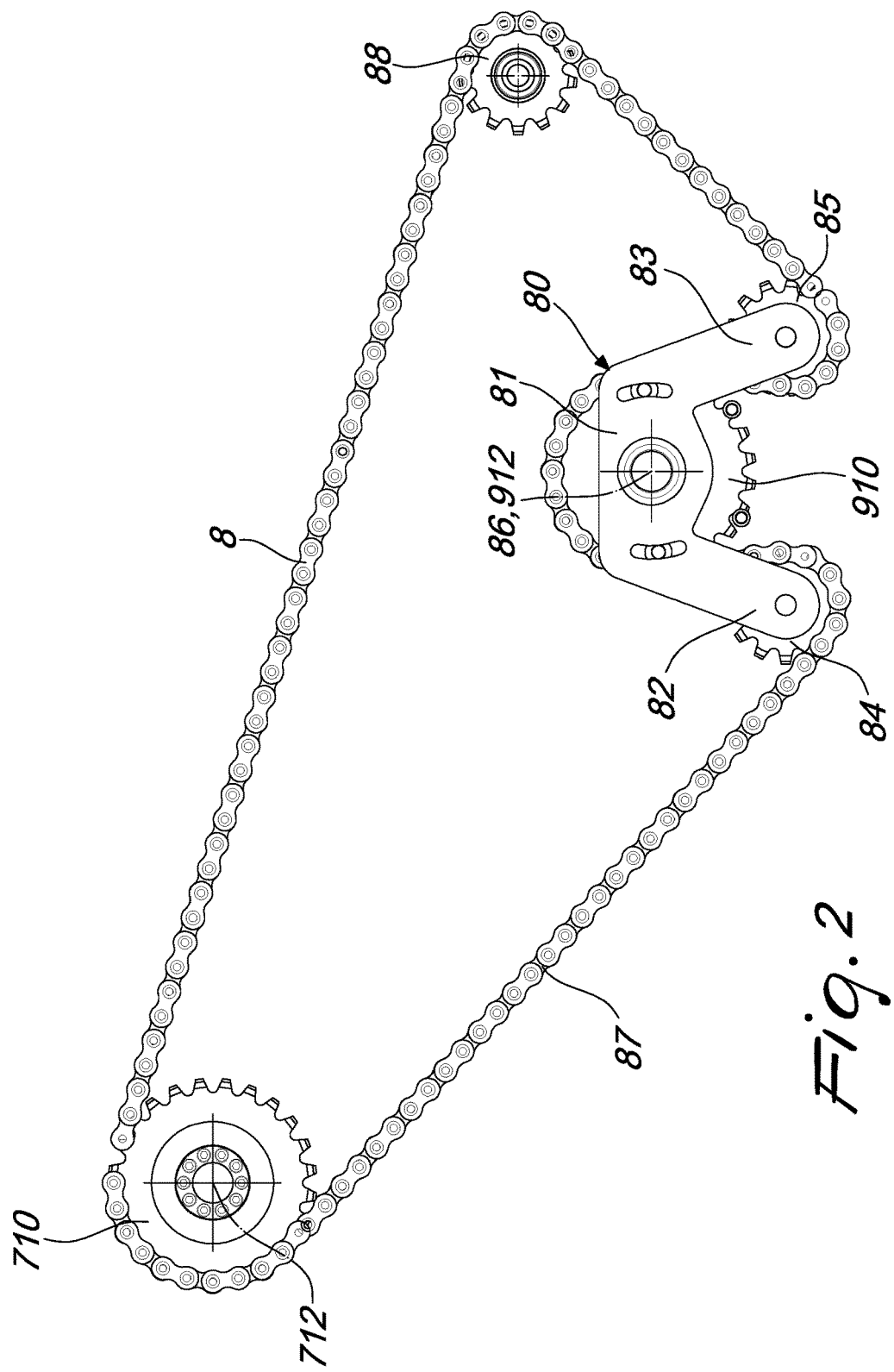
FIG. 2 is a schematic side view of the chain of motion transmission between the two conveyors of the machine of FIG. 1 and of the corresponding offsetting means, according to the disclosure.

In particular, as shown in particular in FIG. 2, the upper sprocket 710 and the lower sprocket 910 are connected kinematically by a transmission chain 8.

Furthermore, the automatic machine 1 may comprise means 80 for offsetting the rotation of the upper sprocket 710 about its own rotation axis 712 with respect to the rotation of the lower sprocket 910 about its own rotation axis 912, in order to ensure that the upper abutment elements 70 are intercalated between the lower abutment elements 90.

The offset means 80 comprise advantageously a guiding fork 81, which comprises two arms 82 and 83, with which two guiding sprockets 84 and 85 are associated respectively in order to guide the transmission chain 8. The guiding fork 81 can rotate with respect to its own rotation axis 86, which can coincide with the rotation axis 912. The rotation of the guiding fork 81 about its own axis 86 varies the length of the segment 87 of the transmission chain 8 that is comprised between the upper sprocket 710 and the lower sprocket 910, thus achieving the desired offset of the rotation of the upper sprocket 710 with respect to the rotation of the lower sprocket 910. This possibility to control the angular offset between the two sprockets, the upper one 710 and the lower one 910, is particularly useful during the steps for setup and registration of the automatic machine 1 in order to register and correct the relative position of the upper and lower abutment elements 70 and 90.

Additional guiding sprockets which engage the transmission chain 8, such as for example the sprocket 88, depending on the relative arrangement of the two conveyors 7 and 9, may further be present.

The automatic machine 1 advantageously comprises, downstream of the work area 11, means 6 for fixing a flat ribbon 60 to the ribbon 5 in its corrugated configuration obtained in passing through the work area 11, in order to obtain a sheet-like corrugated element that is composed of a corrugated layer and a flat layer.

The fixing means 6 advantageously comprise a hot air blower 62, which is adapted to heat-seal the flat ribbon 60 to the ribbon 5 in its corrugated configuration, and in particular at the peaks of the corrugations of the corrugated ribbon 5. As an alternative, the fixing means 6 can comprise a glue applicator.

The lower abutment elements 90 advantageously have a smooth shape, which is adapted to facilitate the extraction thereof from the corrugation already formed in the ribbon 5. In particular, the lower abutment elements 90 are configured to push the ribbon 5 between the upper abutment elements 70, and said ribbon 5, made of elastic material, tends to deform and to adhere to the grip means 75, 77, 770 and in particular to the undercut portions 75, 77 of the flaps 71, preventing the formed corrugation from exiting from the upper abutment elements 70 even when the lower abutment elements 90, which are smooth, are extracted from the corrugation.

Figure 4:
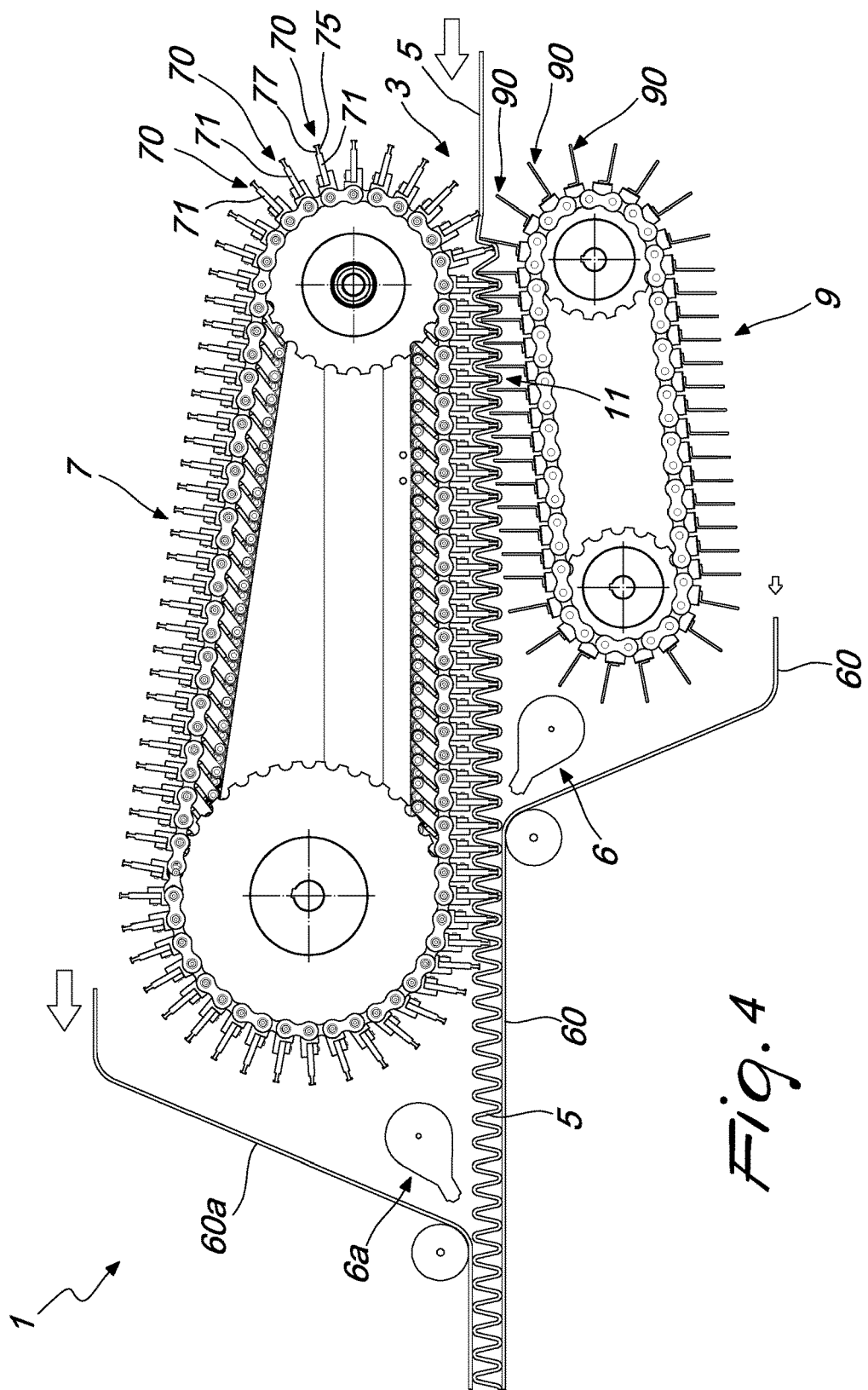
FIG. 4 is a view of a first variation of the machine for providing corrugated sheet-like elements according to the disclosure.

FIG. 4 shows a first variation of the automatic machine 1 shown in FIG. 1. Said machine is provided with an upper conveyor 7, such as the one described and illustrated in Italian patent application no. MI2013A000271, by the same Applicant, provided with upper abutment elements 70 that comprise means for advancing and delaying the entry and exit thereof with respect to the work area 11, wherein the upper abutment elements 70 comprise flaps 71 with portions that comprise the grip means 75, 77, 770.

As shown in FIG. 4, moreover, there can be two different fixing means 6 and 6a for the provision of a corrugated sheet-like element that is defined by two flat layers 60 and 60b between which a corrugated layer provided starting from the ribbon 5 is interposed.

FIG. 5 shows a second variation, which represents the preferred embodiment, of the automatic machine 1 shown in FIG. 1. The machine 1 is provided with an upper conveyor 7 that has upper abutment elements 70 that comprise flaps 71 with portions comprising grip means 75, 77, 770. The lower conveyor 9 corresponds to the conveyor described and illustrated in Italian patent application no. MI2013A000271, by the same Applicant, provided with lower abutment elements 90 which comprise means for advancing and delaying the entry and exit thereof with respect to the work area 11.

Operation of the machine for providing corrugated sheet-like elements is clear and evident from what has been described.

In practice it has been found that the machine for providing corrugated sheet-like elements according to the present disclosure achieves the intended aim and objects, since it allows to provide corrugated sheet-like elements starting from the most disparate types of material, including also elastic materials such as expanded polyethylene.

Another advantage of the machine for providing corrugated sheet-like elements according to the disclosure resides in that it provides clearly defined and precise corrugated configurations.

A further advantage relates to the easy setup of said automatic machine, thanks to the simple rotation of the guiding fork.

The machine for providing corrugated sheet-like elements thus conceived is susceptible of numerous modifications and variations.

All the details may further be replaced with other technically equivalent elements.

In practice, the materials used, so long as they are compatible with the specific use, as well as the contingent shapes and dimensions, may be any according to requirements.

The invention claimed is:

1. An automatic machine for providing corrugated sheet-like elements, comprising means for the continuous corrugation of a ribbon in motion in a longitudinal direction, said corrugation means comprising an upper conveyor and a lower conveyor, said upper conveyor comprising a plurality of upper abutment elements that are extended substantially transversely to said longitudinal direction of motion of said ribbon, said lower conveyor comprising a plurality of lower abutment elements that are extended substantially transversely to said longitudinal direction of motion of said ribbon, said upper abutment elements being intercalated between said lower abutment elements in a work area, wherein said upper abutment elements each comprise a flap, which has, in the end adapted to make contact with said ribbon, at least one portion comprising grip means, said upper conveyor and said lower conveyor each comprising respectively an upper chain and a lower chain, which unwind continuously, said upper abutment elements and said lower abutment elements being associated respectively with the links of said upper chain and of said lower chain, in said work area, said lower chain defining a lower movement direction of said lower abutment elements that is inclined with respect to the upper movement direction of said upper abutment elements defined by said upper chain, said upper conveyor comprising at least two upper sprockets, with which said upper chain is associated, said lower conveyor comprising at least two lower sprockets with which said lower chain is associated, at least one upper sprocket of said upper sprockets being connected kinematically to at least one lower sprocket of said lower sprockets, so that the rotation of said at least one upper sprocket causes the rotation of said at least one lower sprocket or vice versa, said at least one upper sprocket and said at least one lower sprocket being connected kinematically by a transmission chain, and further comprising means for offsetting the rotation of said upper sprocket about its own rotation axis with respect to the rotation of said lower sprocket relative to its own rotation axis in order to ensure that said upper abutment elements are intercalated between said lower abutment elements.

2. The automatic machine according to claim 1, wherein said offsetting means comprise a guiding fork that comprises two arms with which two guiding sprockets are associated respectively to guide said transmission chain, said guiding fork being rotatable with respect to a rotation axis, the rotation of said guiding fork varying the length of the segment of said transmission chain comprised between said upper sprocket and said lower sprocket in order to offset the rotation of said upper sprocket with respect to the rotation of said lower sprocket.

3. The automatic machine according to claim 1, further comprising, downstream of said work area, means for fixing a flat ribbon to said ribbon in its corrugated configuration obtained in passing through said work area.

4. The automatic machine according to claim 1, wherein said fixing means comprise a hot air blower or a glue applicator to join said flat ribbon to said ribbon in its corrugated configuration.

* * * * *